United States Patent [19]
Groves

[11] 3,923,222
[45] Dec. 2, 1975

[54] BAG CARRIER

[76] Inventor: Richard B. Groves, Colonial Manor Apts. 6F, Chestertown, Md. 21620

[22] Filed: Nov. 18, 1974

[21] Appl. No.: 524,711

[52] U.S. Cl. .................. 224/58; 224/26 G; 190/59
[51] Int. Cl.² ........................................ B65D 71/00
[58] Field of Search ..... 224/49, 55, 58, 28 A, 45 C, 224/45 H, 5 Q, 5 MA, 26 G; 294/31.2; 190/59

[56] References Cited
UNITED STATES PATENTS

| | | | |
|---|---|---|---|
| 1,146,334 | 7/1915 | Lehman et al. | 294/31.2 |
| 1,451,564 | 4/1923 | Edmister | 294/31.2 |
| 1,838,348 | 12/1931 | Woodman | 294/31.2 |
| 2,524,639 | 10/1950 | Saunders | 294/31.2 |
| 3,220,626 | 11/1965 | Tupper | 224/55 |
| 3,315,857 | 4/1967 | Eclov | 224/55 |

*Primary Examiner*—Robert J. Spar
*Assistant Examiner*—Kenneth Noland
*Attorney, Agent, or Firm*—Walter G. Finch

[57] ABSTRACT

An improved bag carrier is provided for reinforcing and carrying shopping bags and the like. This bag carrier is constructed of strip material, flexible and of suitable strength to form a skeleton frame wherein a shopping bag or the like is supported and carried. The strip material is sewn together and so designed that handles are provided for carrying shopping bags. Also, there are provided snap fasteners on both sides of the carrier which allows the carrier to be opened wide to facilitate securing a loaded shopping bag or the like.

3 Claims, 5 Drawing Figures

U.S. Patent  Dec. 2, 1975  3,923,222
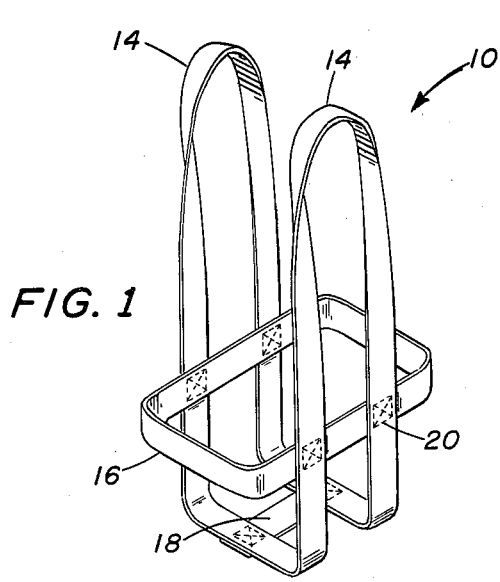
FIG. 1
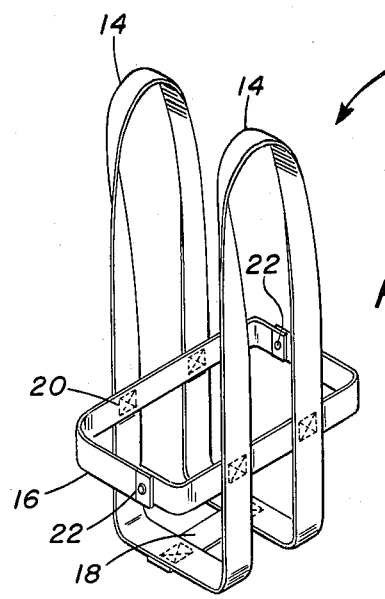
FIG. 2
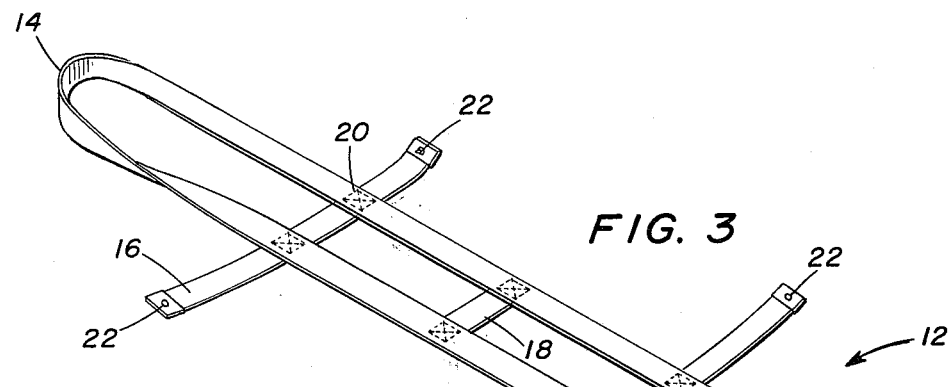
FIG. 3
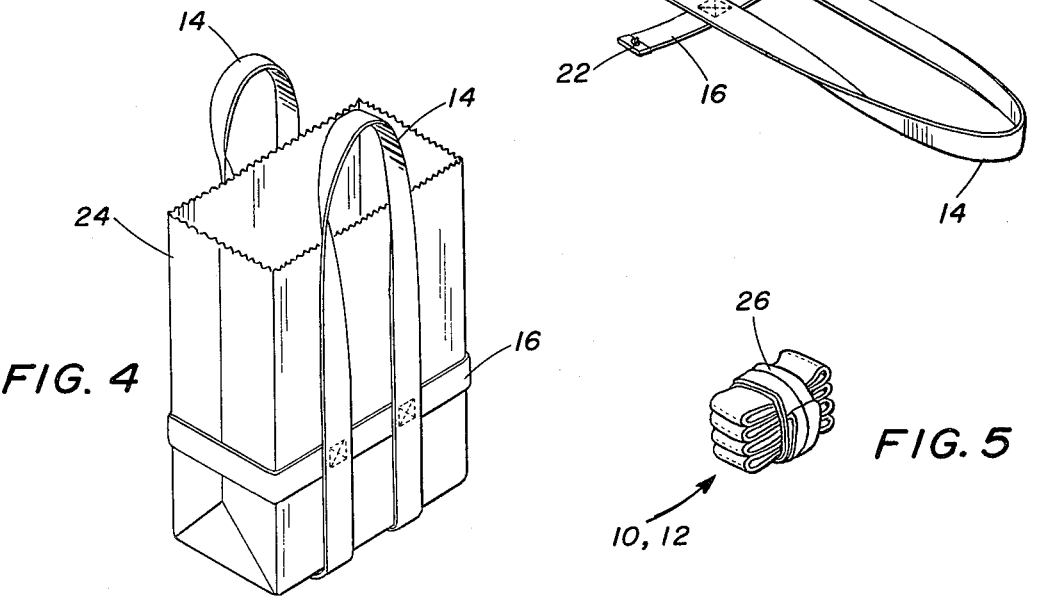
FIG. 4
FIG. 5

BAG CARRIER

This invention relates generally to carrying devices, and more particularly it pertains to bag carriers for reinforcing and carrying shopping bags and the like.

Due to the supporting and reinforcing features of the carrier, the bag that holds the load, as for example groceries, need not be secured by double bagging thus causing a saving.

It is an object of this invention to provide a bag carrier which reinforces a shopping bag so that a single bag may be used even with relatively heavy loads.

Another object of this invention is to provide a carrier so designed that it may be partially separated by means of snap hooks for easy loading of the bag or the like.

A further object of this invention is to provide a carrier wherein the handles are formed as an integral part of the entire carrier.

A still further object of this invention is to provide a carrier which is flexible and may be compactly collapsed and folded when not in use.

In summary, the bag carrier is made of a suitable strip material sewn together to form a skeleton frame. The bag carrier is provided with handles for carrying a bag and snap fasteners on each side thereof which may be opened wide for easy placement there within of a shopping bag of the like.

Other objects and attendant advantages of this invention will become more readily apparent and understood from the following detailed specification and accompanying drawings in which:

FIG. 1 is a perspective view of a bag carrier incorporating features of this invention shown in its carrying position;

FIG. 2 is similar to FIG. 1 and with the added feature of the two sides separating snap fasteners;

FIG. 3 is a perspective view showing the carrier of FIG. 2 separated and opened;

FIG. 4 shows the bag carrier of FIG. 1 with a typical shopping bag installed; and FIG. 5 shows the bag carrier folded, when not in use.

Referring to the drawings in which like reference numbers refer to like parts in all figures, bag carriers 10 and 12 are shown alone, in their carrying or upright position, in FIGS. 1 and 2. Each bag carrier 10 or 12 is constructed of flexible strip material 14, 16 and 18, preferably a suitable plastic having the desired strength.

The strip 14 and 16 are sewn together at juncture areas 20 to form a loop which includes the bottom, the two vertical sides and the two handles.

Strip 18 is sewn at area 20 to form the bottom support. Midway up the vertical sides, strip 16 is sewn at area 20 to form a four sided horizontal support.

Bag carrier 12 is provided with two snap fasteners 22 mounted onto the horizontal strip 16 which allows the bag carrier 12 to be opened wide to place a shopping bag 24 or the like into it for securing. FIG. 3 shows the bag carrier in its open position.

In FIG. 4, the bag carrier 10 is shown with a typical shopping bag 24 placed therein. When not in use the flexible bag carrier 10 or 12 may be folded and secured within an elastic band 26 as shown in FIG. 5.

Obviously many modifications and variations of the present invention are possible in light of the above teachings. It is, therefore, to be understood that within the scope of the appended claims the invention may be practiced otherwise than as specifically described.

What is claimed is:

1. A flexible bag carrier in the form of a skeleton frame of flexible material strip which when unfolded can be used for carrying and reinforcing shopping bags and which can be folded to a collapsed storage position when not in use, comprising, a pair of continuous elongated flexible material loop strips, one of said flexible loop strips being longer in length than the other of said flexible loop strips, said one of said flexible loop strips having laterally spaced vertical sections with handle means at the upper ends thereof and having transversely extending lower end sections for supporting a bag, the other of said flexible loop strips being formed of a plurality of sides and joined horizontally to said laterally spaced vertical sections of said one flexible loop strip, and a flexible strip for joining said lower end sections of said one flexible loop strip together, the other of said flexible loop strips being provided with a plurality of snap fasteners to allow said bag carrier to be opened wide to place a shopping bag into the bag carrier for support and reinforcing thereof, said flexible loop strips when opened up for storage lying in substantially the same plane.

2. A flexible bag carrier as recited in claim 1, wherein said flexible loop strips are formed of plastic material.

3. A flexible bag carrier as recited in claim 1, and means for joining said flexible strips together at their juncture areas.

* * * * *